(12) United States Patent
Crighton et al.

(10) Patent No.: US 6,235,143 B1
(45) Date of Patent: May 22, 2001

(54) HEAT SEALED POLYMERIC FILMS

(75) Inventors: Allan J. Crighton; Paul T. Alder, both of Swindon (GB)

(73) Assignee: Trespaphan GmbH, Weisbaden (DE)

( * ) Notice: Subject to any disclaimer, the term of this patent is extended or adjusted under 35 U.S.C. 154(b) by 0 days.

(21) Appl. No.: 09/235,297

(22) Filed: Jan. 22, 1999

Related U.S. Application Data

(63) Continuation of application No. 08/750,849, filed as application No. PCT/GB96/00976 on Apr. 24, 1996, now abandoned.

(30) Foreign Application Priority Data

Apr. 27, 1995 (GB) .................................................. 9508551

(51) Int. Cl.$^7$ .................................................. B32B 27/18
(52) U.S. Cl. ...................... 156/308.4; 428/327; 428/332; 428/349
(58) Field of Search ........................ 156/308.4; 428/327, 428/332, 349

(56) References Cited

U.S. PATENT DOCUMENTS

| | | | |
|---|---|---|---|
| 3,264,136 | * | 8/1966 | Hedge . |
| 5,147,696 | * | 9/1992 | Lansbury .............................. 428/327 |
| 5,270,282 | * | 12/1993 | Hirst ..................................... 428/330 |
| 5,441,802 | * | 8/1995 | Mizuno ................................. 428/327 |
| 5,441,806 | * | 8/1995 | Brandt ................................. 428/349 |
| 5,556,920 | * | 9/1996 | Tanaka ................................. 428/910 |

\* cited by examiner

*Primary Examiner*—Sam Chaun Yao
(74) *Attorney, Agent, or Firm*—Blank Rome Comisky & McCauley LLP

(57) ABSTRACT

A method of heat sealing a heat sealable multilayer film having a first film surface which is heat sealable to itself or to other surfaces and a second film surface including particles of a cross-linked polymethyl methacrylate as an antiblock agent, the method comprising sliding the said second film surface over a heated heat sealing surface before effecting heat sealing of the film to itself or to another surface using said heated heat sealing surface.

7 Claims, 1 Drawing Sheet

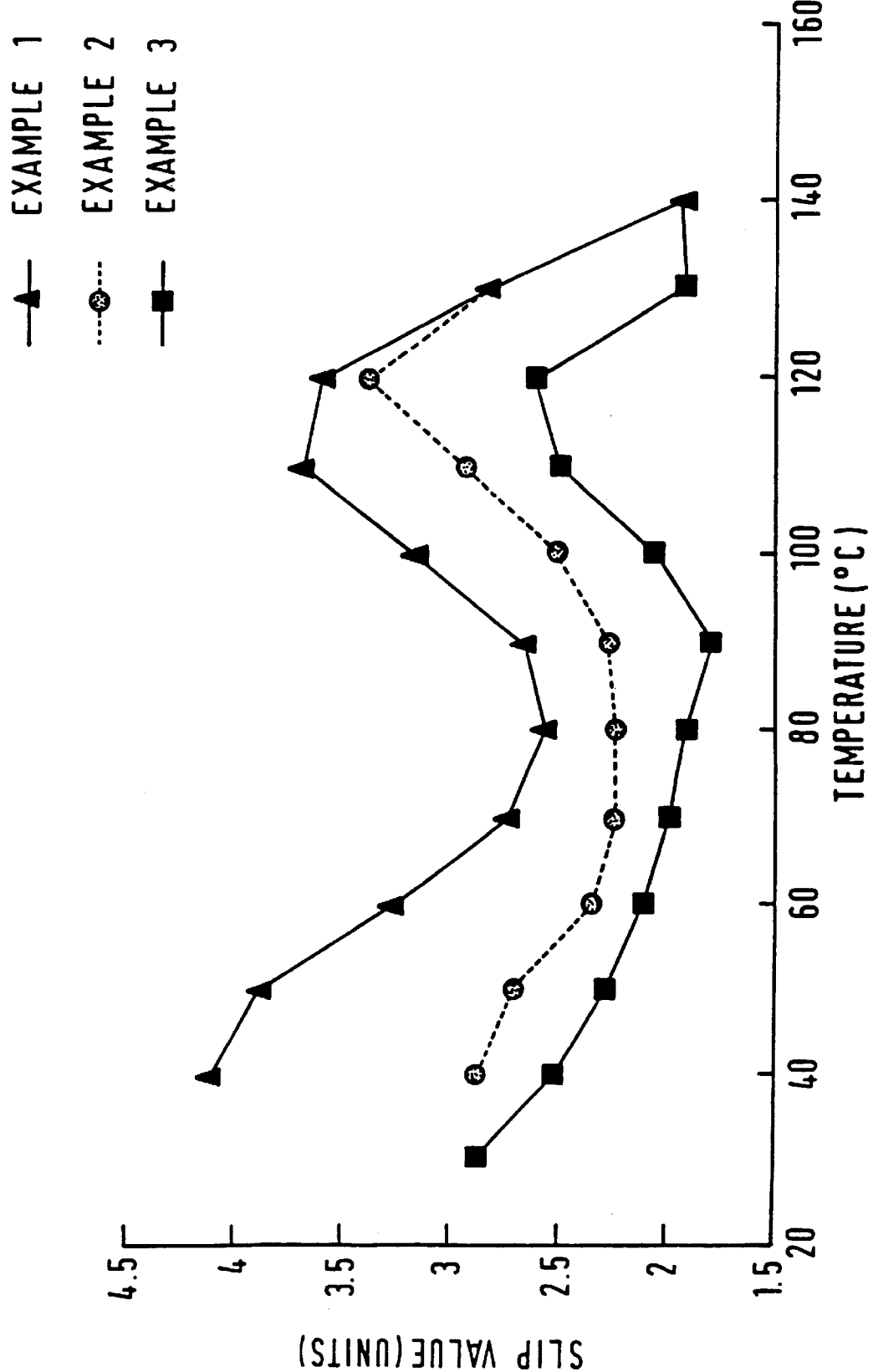

HEAT SEALED POLYMERIC FILMS

This application is a continuation of nonprovisional patent application Ser. No. 08/750,849 filed Jun. 4, 1997 now abandoned which is 371 of PCT/GB96/00976 Apr. 24, 1996.

BACKGROUND OF THE INVENTION

1. Field of the Invention

This invention concerns heat sealed polymeric films and the formation of such seals with such films.

2. Description of Related Art

Polymeric films used for packaging are usually required to have good slip properties both when hot, so that the film slides satisfactorily on metal surfaces of packaging machines, and when cold, so that the packages themselves can slide on each other. Particularly demanding conditions occur in the formation of so-called "drag-seals" where film to be sealed is pulled across the face of a hot heat surface before heat sealing is effected, compared with situations in which the film is required to slide over other hot metal surfaces, for example in form-fill-seal machines.

Increased slip can be provided by the use of larger amounts of slip and/or antiblock agents. However, increasing the amount of such agents often reduces the optical properties of the films, relatively large amounts of such agents often increasing the haze of the films. In the case of increased amounts of inorganic antiblock agents such as silica or zeolites, the result can be scratching of the film by film-to-film contact caused by the abrasive effect of the antiblock agent.

The result of these problems is that a trade off is made between the speed of packaging which can be carried out and the optical properties of the film being used.

One proposal for dealing with this problem has been to use organic antiblock agents. However, hitherto proposed organic antiblock agents often have relatively low softening temperatures and/or melting points, which leads to poor hot slip properties even if their room temperature slip properties and haze are otherwise satisfactory. Furthermore, the temperatures used to extrude the polymers used to produce polymeric films are often sufficiently high that hitherto proposed organic antiblock agents degrade at the extrusion temperatures, leading to the build up of degraded material at the die. This can happen, for example, when using polyamide antiblock agents. Hitherto proposed polyalkyl methacrylate antiblock agents have also been found to reduce in size during extrusion, thereby leading to a reduction in their effectiveness as an antiblock agent.

SUMMARY OF THE INVENTION

According to the present invention there is provided the use of drag sealing to heat seal a heat sealable polymeric film including particulate cross-linked polymethyl methacrylate as an antiblock agent.

The invention further provides a method of heat sealing a heat sealable multilayer film having a first film surface which is heat sealable to itself or to other surfaces and a second film surface including particles of a cross-linked polymethyl methacrylate as an antiblock agent, the method comprising sliding the said second film surface over a heated heat sealing surfaces before effecting heat sealing of the film to itself or to another surface using said heated heat sealing surfaces.

The use of drag sealing to seal films which use cross-linked polymethyl methacrylate as an antiblock agent has resulted in good sealing with high slip on the heat seal jaws, particularly when compared with analogous films using comparable weights of silica or nylon antiblock agents.

BRIEF DESCRIPTION OF THE DRAWINGS

FIG. 1 is a graph of the test results obtained with Example 1, and comparison Examples 2 and 3.

DETAILED DESCRIPTION OF THE INVENTION

Multilayer films used in accordance with the present invention can consist of two or more layers, usually of one or more polyolefins. As will be appreciated by those skilled in the art, the precise film structure is relatively unimportant since the present invention is concerned with the outer surface of the films being sealed rather than any layer or layers which may be present beneath the outer surface. However, particularly preferred films have a core layer with a first and second outer layer, the first and second outer layers respectively defining the first and second film surfaces.

Especially preferred films for use in accordance with the present invention have a core layer, for example of a propylene polymer, more particularly a propylene homopolymer, with two outer layers, at least one of the outer layers being heat sealable to itself and/or to another surface and defining the second surface, and the other defining the first surface and having the particulate cross-linked polymethyl methacrylate in its surface. Preferably, the polymer layer defining the first surface is also heat sealable to itself and/or to other surfaces.

The first surface of the films to be sealed in accordance with the present invention include a particulate cross-linked polymethyl methacrylate as an antiblock agent. However, the second film surface can also include a particulate cross-linked polymethyl methacrylate antiblock agent, for example to impart good hot slip properties to the second film surface.

The cross-linked polymethyl methacrylate antiblock agent is preferably in the form of microspheres, and the mean particle size of the cross-linked polymethyl methacrylate is preferably from 2 to 6 $\mu$m.

The preferred amount of particulate cross-linked polymethyl methacrylate is from 500 to 6000 ppm, more preferably from 1000 to 5000 ppm, based on the weight of the respective layer or layers in which it is present.

Other antiblock agents can also be present in either or both of the film surfaces which contain the cross-linked polymethyl methacrylate antiblock agent. However, excessive total amounts of antiblock agents can reduce the optical properties of the films, for example their gloss and/or haze. It is therefore generally preferred to include relatively low amounts of other antiblock agents. It is generally preferred that when silica is the other antiblock agent it is present in an amount not in excess of 2000 ppm based on the weight of the layer in which it is present with the particulate cross-linked polymethyl methacrylate. Excessive total amounts of antiblock agent can lead to reduced sealing performance, particularly in low pressure sealing applications.

Films used in accordance with the present invention can be produced by known methods, for example by coextrusion of the respective layers of the films, and in general biaxially orienting the resultant co-extrudate.

The following Examples are given by way of illustration only.

EXAMPLE 1

A three layer film was produced by coextruding a core layer of a polypropylene homopolymer with a first outer layer of a polymer blend containing a mixture of antiblock agents on one surface of the core layer, and a second outer layer of a single copolymer plus an antiblock agent on the other surface of the core layer.

The polymer blend used for the first layer consisted of a blend of 25 wt % of a propylene/butene-1 copolymer (20 mol % butene-1) and 75 wt % of a propylene/ethylene copolymer (5 mol % ethylene). The antiblock agents consisted of 5000 ppm of a particulate polymethyl methacrylate with a mean particle size of 4 $\mu$m (EPOSTAR 1004 MA—Nagase & Co., Ltd, Japan) used as a masterbatch in some of the propylene/ethylene copolymer referred to above (ABVT22SCN supplied by Schulman Plastics NV, Belgium as a 10 wt % dispersion in the copolymer, a proportion of the copolymer having been modified with maleic anhydride), 940 ppm of silica with a mean particle size of 2 $\mu$m from the masterbatch and the remainder of the propylene/ethylene copolymer, and 760 ppm of silica with a mean particle size of 4 $\mu$m from the propylene/butene-1 copolymer.

The second outer layer consisted of the propylene/ethylene copolymer used in the first layer, and it contained 1000 ppm of silica having a mean particle size of 2 $\mu$m.

The resulting extruded three layer web was cooled on a chill roll, and it was then stretched 4.5 times in the direction of extrusion by passing it over heated rollers at 110° C., followed by 10 times in the transverse direction in a stenter oven at 160° C. The film was then heat set, the second layer was corona discharge treated to increase its surface energy (42 J/cm$^2$), and the film was wound up.

The film had a total thickness of 18 $\mu$m, with the outer layer formed from the copolymer blend having a thickness of 1.4 $\mu$m and the other outer layer having a thickness of 1 $\mu$m.

EXAMPLE 2 (COMPARISON)

A three layer film was produced substantially as described in Example 1, except that the masterbatch containing the EPOSTAR 1004 MA was replaced by 10 wt % of a masterbatch of particulate nylon with a mean particle size of 3 $\mu$m in the same propylene/ethylene copolymer to yield a polymer blend containing 5000 ppm of the nylon based on the weight of the blend.

EXAMPLE 3 (COMPARISON)

A three layer film was produced substantially as described in Example 1, except that the masterbatch used to add the EPOSTAR 1004 MA was replaced by an equivalent weight of the propylene/ethylene copolymer.

Hot Slip Test Method

The apparatus used to test film samples for their dynamic slip properties at various temperatures, thereby to give an indication of their performance in forming drag seals, included a flat, horizontal metal bed approximately 50 cm long and 20 cm wide, and a film transport system consisting of a pair of rubber rollers driven by a motor so that the film to be tested could be pulled across the metal bed.

An electrically heatable metal sled 8.9 cm long and 6.35 cm wide, and weighing 936 g, was connected to the flat bed via a force transducer so that in use with the sled positioned on the film being tested it was approximately half way across the width of the flat bed, with the length of the sled being substantially parallel to the longer dimension of the bed. The attachment of the transducer to the flat bed was also such that transport of the film across the flat bed by the film transport system caused the film to drag the sled with it, and thereby provide an output indicative of the frictional force required to move the film relative to the sled.

The output of the force transducer was connected to a chart recorder to provide a time variant record indicative of the frictional force between the sled and the film as the film was drawn through the apparatus by the film transport system. The temperature of the sled was monitored by a thermistor linked to a visual display.

A sample of the film to be tested, 18 cm wide and approximately 5 m long, was loaded into the apparatus across the flat bed and between the rollers of the film transport system. In testing the films of Examples 1 to 3 the film samples were placed with the layer formed from the polymer blend upwards, and the sled, connected to the flat bed via the force transducer, was than placed on the film sample.

The speed of the motor of the film transport system was set so that the 5 m long film sample was drawn across the flat bed in approximately 3 minutes, and the electric heater in the sled was turned on so that the temperature of the sled increased from room temperature to 140° C. in slightly less time than was required to drag the sample under the sled. The chart recorder was also switched on.

The chart produced by the chart recorder was then marked to show when the sled had reached certain temperatures.

The slip between the heated sled and the moving film was then calculated at various temperatures from the output of the force transducer as shown on the chart recorder.

The results obtained with Examples 1 to 3 in this test are shown in the accompanying drawing which graphically shows changes in slip (the inverse of coefficient of friction) as a function of changes in the temperature of the sled. As can be seen from the drawing, the film of Example 1, which included a particulate cross-linked polymethyl methacrylate and silica as an antiblock agent, showed particularly high slip against the metal surface of the sled when compared with the comparison films of Examples 2 and 3 which respectively used nylon plus silica or silica alone as the antiblock agent. This improvement was especially marked at the temperatures used to heat seal heat sealable polymeric films, for example at temperatures in excess of 80° C., and more especially at temperatures above 100° C.

What is claimed is:

1. A method of heat sealing a heat sealable multilayer film having a first film surface layer which is heat sealable to itself or to other surfaces and a second film surface layer including particles of a cross-linked polymethyl methacrylate and silica as antiblock agents, the method comprising drag sealing the film by sliding the said second film surface layer over a heated heat sealing surface before effecting heat sealing of the film to itself or to another surface using said heated heat sealing surface, wherein said second film surface layer contains said cross-linked polymethyl methacrylate in an amount from 500 to 6000 ppm based upon the weight of the surface layer and silica in an amount not in excess of 2000 ppm based upon the weight of the second film surface layer, said amounts providing effective hot slip properties; wherein the first film surface layer also includes particles of a cross-linked polymethyl methacrylate as an antiblock agent.

2. A method according to claim 1, wherein the multilayer film comprises a polymeric core layer with a first outer layer thereon defining said first film surface layer and a second outer layer thereon defining said second film surface layer.

3. A method according to claim 1, wherein the cross-linked polymethyl methacrylate in the second film surface layer has a mean particle size of from 2 to 6 μm.

4. A method according to claim 1, wherein the said first film surface layer includes particles of a further antiblock agent, the cross-linked polymethyl methacrylate being present in said first film surface in an amount sufficient to reduce the drag of the film on heated heat sealing surfaces.

5. A method according to claim 1, wherein the heated heat sealing surface is at a temperature of at least 80° C.

6. A method according to claim 5, wherein said temperature is at least 100° C.

7. A method according to claim 6, wherein said temperature is at least 120° C.

* * * * *